(12) United States Patent
Garner

(10) Patent No.: US 7,104,339 B2
(45) Date of Patent: Sep. 12, 2006

(54) AUTOMATICALLY ENGAGING COUPLER WITH FLEXIBLE SHAFT FOR A SEEDING MACHINE

(75) Inventor: Elijah Beckham Garner, Bettendorf, IA (US)

(73) Assignee: Deere & Company, Moline, IL (US)

( * ) Notice: Subject to any disclaimer, the term of this patent is extended or adjusted under 35 U.S.C. 154(b) by 171 days.

(21) Appl. No.: 10/832,767

(22) Filed: Apr. 27, 2004

(65) Prior Publication Data

US 2005/0235891 A1    Oct. 27, 2005

(51) Int. Cl.
*A01B 49/00*     (2006.01)
*A01B 63/10*     (2006.01)
*F16D 3/48*      (2006.01)
*F16D 1/12*      (2006.01)
*F16D 3/10*      (2006.01)

(52) U.S. Cl. .................. 172/311; 172/502; 172/662; 464/137; 464/160

(58) Field of Classification Search ............... 464/137, 464/160; 192/69.61; 111/69, 200; 172/69, 172/103, 501, 502, 662, 156
See application file for complete search history.

(56) References Cited

U.S. PATENT DOCUMENTS

| | | | | |
|---|---|---|---|---|
| 2,148,975 A * | 2/1939 | Agren | ................... | 464/105 |
| 2,552,682 A * | 5/1951 | Lopez | ................... | 464/160 |
| 3,536,144 A * | 10/1970 | Hood et al. | ................... | 172/311 |
| 4,050,522 A * | 9/1977 | Ralston et al. | ................... | 172/311 |
| 4,137,853 A * | 2/1979 | Peterson | ................... | 111/67 |
| 4,433,767 A * | 2/1984 | Thor | ................... | 192/69.61 |
| 4,450,915 A * | 5/1984 | DeHaai | ................... | 172/55 |
| 4,545,471 A * | 10/1985 | Danelson et al. | ................... | 192/69 |
| 4,601,372 A * | 7/1986 | Swales et al. | ................... | 192/69.7 |
| 4,690,260 A | 9/1987 | Landphair | ................... | 192/71 |
| 4,779,471 A * | 10/1988 | Rettig | ................... | 74/13 |
| 4,793,743 A * | 12/1988 | Grodecki et al. | ................... | 406/123 |
| 5,330,388 A * | 7/1994 | Blanding | ................... | 464/106 |
| 6,003,454 A * | 12/1999 | Ozers et al. | ................... | 111/184 |
| 6,474,747 B1 * | 11/2002 | Beaulieu et al. | ................... | 30/296.1 |

OTHER PUBLICATIONS

" Flexible Rotary Power Transmission Handbook", Elliott Manufacturing, Apr., 1998.

* cited by examiner

*Primary Examiner*—Daniel P. Stodola
*Assistant Examiner*—Julianne M. Cozad

(57) ABSTRACT

An agricultural seeding machine, includes a seed hopper, a first frame member carrying a drive shaft, a second frame member carrying a driven shaft, a coupler, and a flexible shaft. The first frame member and the second frame member are foldable relative to each other between a folded position and an unfolded operational position. The coupler includes a first coupler half associated with the drive shaft, and a second coupler half associated with the driven shaft. The second coupler half and the first coupler half are configured for automatic engagement and disengagement upon movement between the folded position and the unfolded position respectively. The flexible shaft interconnects the first coupler half with the drive shaft or the second coupler half with the driven shaft.

20 Claims, 3 Drawing Sheets

AUTOMATICALLY ENGAGING COUPLER WITH FLEXIBLE SHAFT FOR A SEEDING MACHINE

FIELD OF THE INVENTION

The present invention relates to agricultural seeding machines, and, more particularly, to couplers for transmitting rotary power from a drive shaft to a driven shaft in such a seeding machine.

BACKGROUND OF THE INVENTION

A current trend in agriculture is that the number of operators has decreased while the number of acres farmed by an operator has increased. This in turn requires a higher efficiency of operation by the operator on multiple fronts. One way of increasing efficiency is to increase the size of the equipment which is used to farm the land. As the working width of various implements pulled by a traction unit (e.g., tractor) has increased in size, the attendant problems with transporting such large implements over roads has needed to be addressed.

One way of minimizing the frontal profile width of an implement is to construct the frame in multiple discrete sections, with at least one of the sections folding relative to another.

In the case of an agricultural seeding machine such as a row crop planter, the individual row units are typically ground driven from a main drive shaft. It is not desirable to separately ground drive the center section from the folding frame section since the operating variables such as tire pressures, etc. may vary and cause different ground drive speeds. As one frame section unfolds and aligns with the other, the main drive shaft generally is in end-to-end and coaxial alignment with the driven shaft carried by the other frame section. One solution for transferring power from the drive shaft to the driven shaft is for the operator to dismount and manually couple the drive shaft with the driven shaft.

Another example for coupling a drive shaft with a driven shaft in an agricultural implement is disclosed in U.S. Pat. No. 4,690,260 (Landphair), which is assigned to the assignee of the present invention. Such a coupler is known as a "tomahawk" coupler and automatically engages and disengages the drive shaft and the driven shaft when the frame member is unfolded to the operational position. This type of coupler for automatic engagement and disengagement was a step forward in the art and is effective for the intended purpose.

What is needed in the art is an agricultural seeding machine having a coupler which automatically engages and disengages a drive shaft and a driven shaft where one frame member is not only moveable between a folded and an unfolded position, but is also moveable in a generally vertical direction corresponding to the contour of the ground.

SUMMARY OF THE INVENTION

The present invention provides a rotary power transmission coupling for transmitting rotary power from a drive shaft to a driven shaft, including at least one coupler half which is connected to a flexible shaft.

The invention comprises, in one form thereof, an agricultural seeding machine, including a seed hopper, a first frame member carrying a drive shaft, a second frame member carrying a driven shaft, a coupler, and a flexible shaft. The first frame member and the second frame member are foldable relative to each other between a folded position and an unfolded operational position. The coupler includes a first coupler half associated with the drive shaft, and a second coupler half associated with the driven shaft. The second coupler half and the first coupler half are configured for automatic engagement upon movement of the frame from the folded to the unfolded position, accompanied by rotation of the drive coupler half relative to the driven coupler half. Disengagement occurs upon movement of the planter frame from the unfolded position to a folded position. The flexible shaft interconnects one of the coupler halves to it's corresponding supported rotational shaft.

An advantage of the present invention is that the drive shaft and driven shaft are automatically engaged and disengaged when the frame members are unfolded or folded, respectively as described above.

Another advantage is that the flexible shaft allows the coupler halves to be offset relative to each other and then automatically engaged upon rotation of the drive shaft.

Yet another advantage is that the frame members may move relative to each other through an angular arc about a point near the centroid of the flexible shaft, and the flexible shaft bends through the angular arc to keep the coupler halves engaged.

A further advantage is that the flexible shaft allows the drive shaft and the driven shaft to be axially offset relative to each other and still maintain a driving condition to the driven shaft.

A still further advantage is that the coupler half carried by the drive shaft fully and automatically engages the coupler half carried by the driven shaft within one revolution or less of the drive shaft.

A further advantage is that the flexible shaft does not have to be as rigidly supported as other known types of automatically engaging and disengaging couplers.

Yet another advantage is that the coupler halves and flexible shaft can maintain near constant rotational velocity of the driven shaft relative to the drive shaft inspite of dynamic events of axial misalignment, or angular rotation of the driven shaft relative to the drive shaft.

DESCRIPTION OF THE PREFERRED EMBODIMENT

Figure 1:
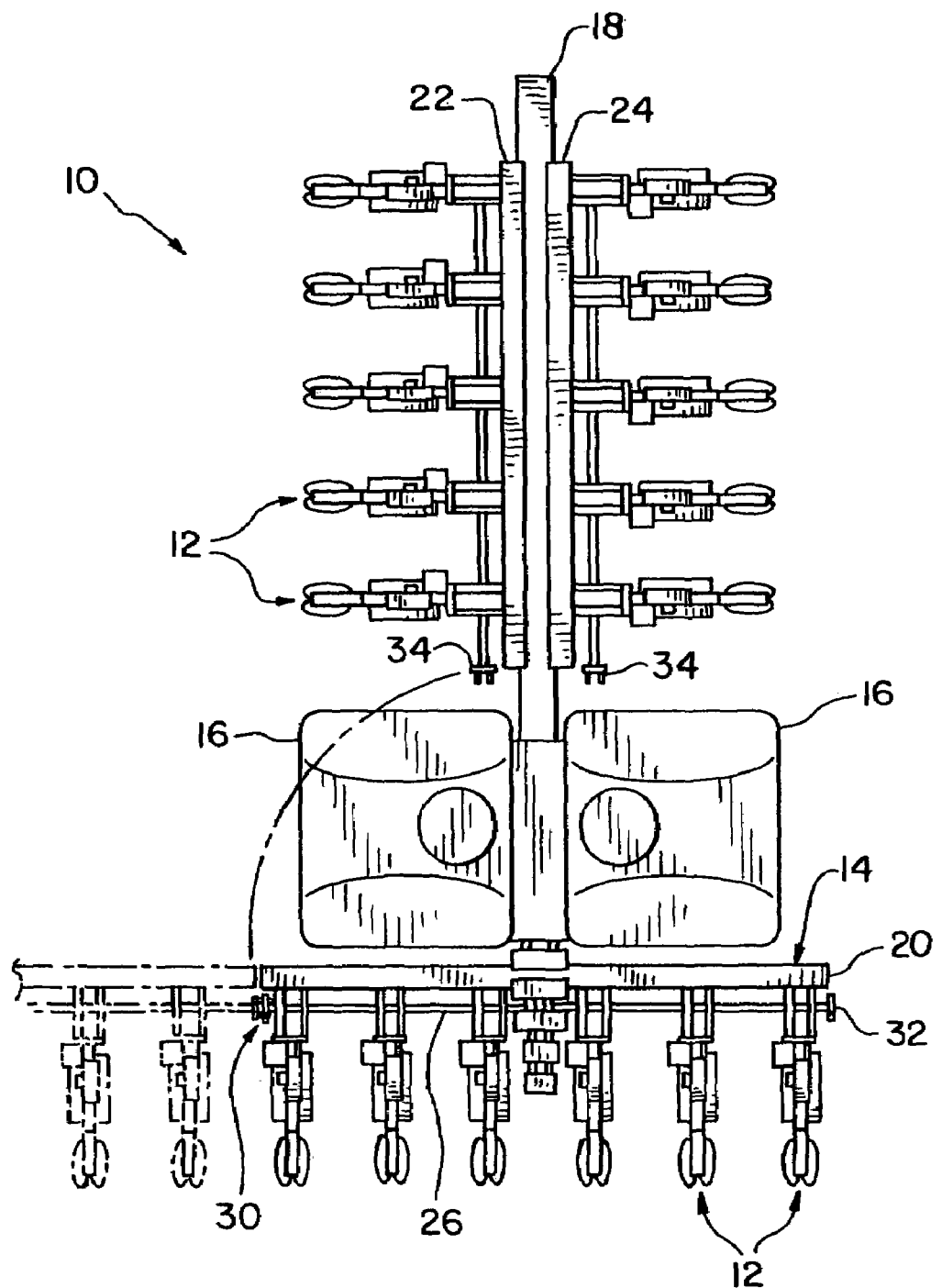
FIG. 1 is a top view of an embodiment of an agricultural seeding machine, including an embodiment of a self-engaging coupler of the present invention.

Referring now to the drawings, and more particularly to FIG. 1, there is shown an embodiment of an agricultural seeding machine 10 of the present invention which is drawn by a traction unit (e.g., tractor), not shown. In the embodiment shown, seeding machine 10 is in the form of a row crop planter including a plurality of row units 12 which are carried by a tool bar 14. Row units 12 are substantially identically configured, and receive seeds from seed hoppers 16. Draw bar 18 is coupled at one end with tool bar 14, and is coupled at the other end to the traction unit. Draw bar 18 also carries seed hoppers 16.

Tool bar 14 is divided into three separate sections in the embodiment shown, including a first frame member 20, second frame member 22 and third frame member 24. Second frame member 22 is foldable relative to first frame member 20 between a folded transport position (shown in solid lines) and an unfolded operational position (shown in phantom). Similarly, third frame member 24 is foldable between a transport position and an operational position relative to first frame member 20. The overall width of seeding machine 10 when second frame member 22 and third frame member 24 are in the unfolded position is typically too wide for traveling down a road, through gates, etc., and therefore it is necessary to fold second frame member 22 and third frame member 24 for preparation for transport.

First frame member 20 also carries a main shaft 26 which is typically in the form of a hexagonal shaft which is ground driven by one or more wheels carrying seeding machine 10. Similarly, each of second frame member 22 and third frame member 24 carry a shaft which substantially coaxially aligns with main shaft 26 when second frame member 22 and third frame member 24 are in the unfolded position. Main shaft 26 is connected with shafts 28 when second frame member 22 and third frame member 24 are in the unfolded position; thus, main shaft 26 acts as a drive shaft and shafts 28 are driven shafts. Acting together, main drive shaft 26 and driven shafts 28 provide a source of ground driven power from which power is derived for row units 12 for various purposes, such as a seed meter, herbicide meter and/or insecticide meter.

When second frame member 22 and third frame member 24 are unfolded, or alternatively folded, it is desirable to automatically engage and disengage drive shaft 26 with driven shaft 28 so that an operator does not need to dismount from the traction unit and manually perform this function. As described above, U.S. Pat. No. 4,690,260 (Landphair), which is assigned to the assignee of the present invention, provides one solution for this problem.

Figure 2:
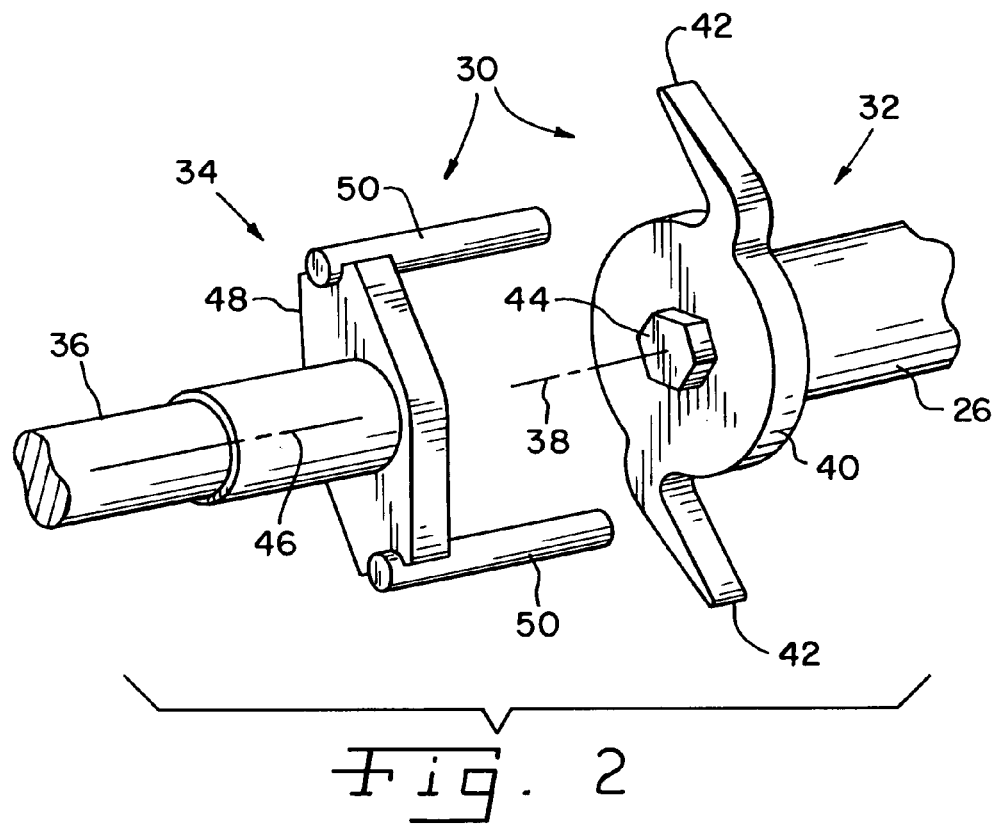
FIG. 2 is a perspective view of a coupler shown in FIG. 1 in a disengaged state.
Figure 3:
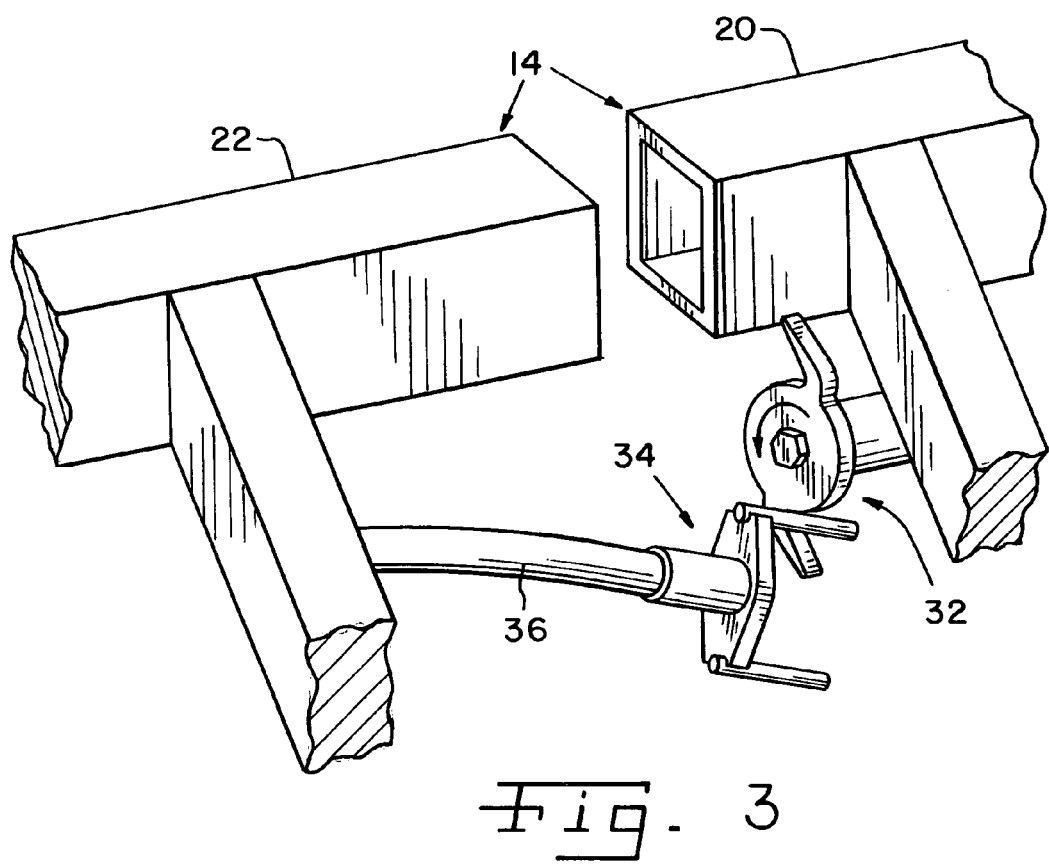
FIG. 3 is a perspective view of the coupler shown in FIGS. 1 and 2, with a hook of one coupler half engaging a pin of the other coupler half.
Figure 4:
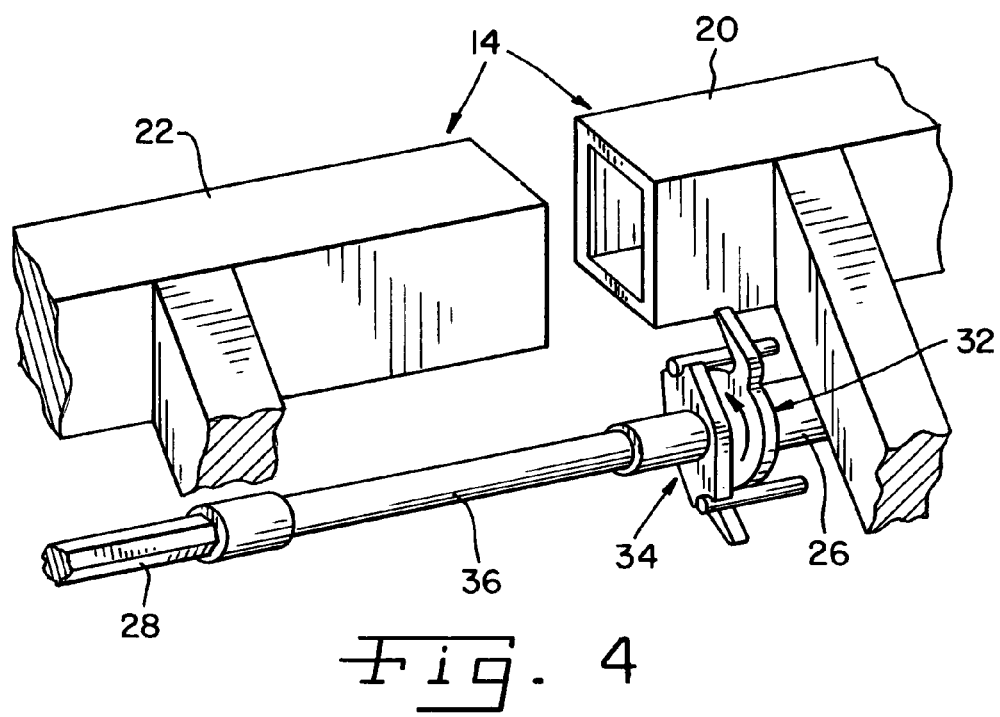
FIG. 4 is a perspective view of the coupler shown in FIGS. 1–3, with the coupler halves fully engaged.

According to an aspect of the present invention, a coupler 30 shown in more detail in FIGS. 2–4 provides another solution for automatically engaging and disengaging drive shaft 26 with driven shaft 28. Coupler 30 generally includes a first coupler half 32, second coupler half 34 and flexible shaft 36.

Flexible shaft 36 is suitably configured to transmit power from main drive shaft 26 to driven shaft 28. For example, a suitable type of flexible shaft for transmitting rotary power is manufactured by Elliott Manufacturing Co., Inc., P.O. Box 773, Binghamton, N.Y. 13902. Flexible rotary power transmission shafts are available from other manufacturers as well.

In the embodiment shown, flexible shaft 36 is crimped at one end to driven shaft 28, and is crimped at the other end to second coupler half 34. The exact attachment mechanism used for coupling flexible shaft 36 with driven shaft 28 and second coupler half 34 may vary, depending upon the application.

Flexible shaft 36 is deflectable in a generally radial direction relative to driven shaft 28 (noting also that flexible shaft 36 is generally coaxial with driven shaft 28 when in a relaxed state). Thus, depending upon the mating angular orientation between the first coupler half 32 and second coupler half 34 when second frame member is unfolded, flexible shaft 36 merely deflects laterally rather than experiencing permanent deformation. (See FIG. 3).

First coupler half 32 is rotatable about a first axis 38 which also corresponds to the axis of rotation of drive shaft 26. First coupler half 32 includes a first transverse plate 40 from which a plurality of hooks 42 radially extend. In the embodiment shown, two hooks 42 are provided; however, a different number of hooks 42 may be provided depending upon the application. First transverse plate 40 is coupled with main drive shaft 26 using a bolt 44 or other suitable fastening techniques.

Second coupler half 34 is rotatable about a second axis 46. It will be appreciated that the exact orientation of second axis 46 will vary depending upon the deflection state of flexible shaft 36. When flexible shaft 36 is at a relaxed state, second axis 46 generally corresponds to the axis of rotation of driven shaft 28.

Second coupler half 34 includes a second transverse plate 48 carrying a plurality of pins 50 which extend generally axially relative to second axis 46. In the embodiment shown, two pins 50 are provided for mating with the corresponding two hooks 42.

During operation, second frame member 22 and third frame member 24 are in the folded transport position shown in FIG. 1 for transport to a working location. Second frame member 22 and third frame member 24 are unfolded, likely by operating a hydraulic lever in the traction unit, such that second and third frame members 22 and 24 are in general alignment with first frame member 20, and driven shafts 28 are in general alignment with main drive shaft 26. Depending upon the mating angular orientation between first coupler half 32 at either end of main drive shaft 26 and second coupler halves 34 at the mating ends of flexible shafts 36 on each respective frame member 22 and 24, pins 50 will likely impinge upon first coupler half 32 and apply a laterally deflecting force to flexible shaft 36 causing flexible shaft 36 to bend. When seeding machine 10 is moved in a forward direction, main drive shaft 26 rotates which causes hooks 42 to likewise rotate about first axis 38. Hooks 42 automatically engage respective pins 50 and receive pins 50 at the base notch thereof (FIG. 3). Power is then transferred from main drive shaft 26 to the corresponding driven shaft 28 (FIG. 4). The automatic engagement between coupler halves 32 and 34 accommodates up to approximately 0.5" of axial parallel offset between drive shaft 26 and driven shaft 28 in the embodiment shown, and couples coupler halves 32 and 34 within one complete revolution of drive shaft 26.

Figure 5:
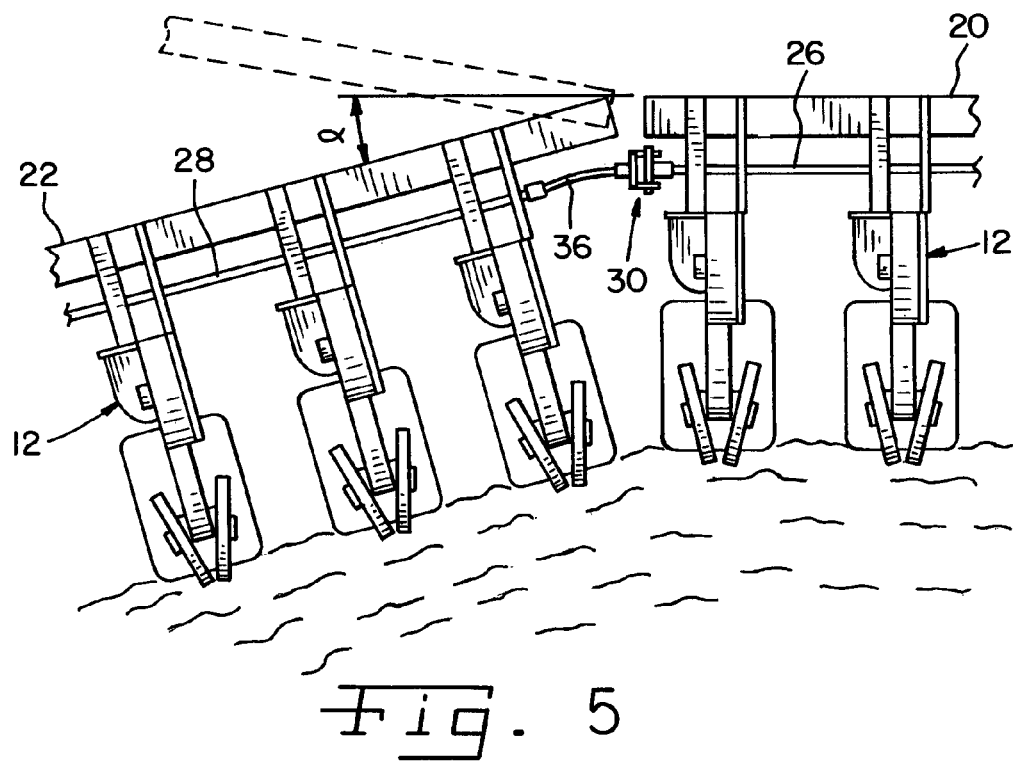
FIG. 5 is a rear view of the seeding machine shown in FIG. 1, with one frame member tipped at a vertically downward angle according to the ground contour.

Depending upon the contour of the ground over which seeding machine 10 is drawn, second frame member 22 and third frame member 24 may move through a generally vertical angular arc in an upward or downward direction to follow the contour of the ground (e.g., ±15 degree angle α; FIG. 5). Flexible shaft 36 bends during such movement and continues to allow power to be transferred from main drive shaft 26 to driven shaft 28.

When preparing for transport, second frame member 22 and third frame member 24 are again folded to the transport position shown in FIG. 1. At the commencement of the folding operation, second coupler halves 34 on the respective frame members 22 and 24 decouple with the first coupler halves 32 at the opposite ends of main drive shaft 26. Flexible shaft 36 is deflectable to the extent necessary to allow decoupling without requiring manual intervention from an operator.

Having described the preferred embodiment, it will become apparent that various modifications can be made without departing from the scope of the invention as defined in the accompanying claims.

The invention claimed is:

1. An agricultural seeding machine, comprising:
   a seed hopper;
   a first frame member carrying a drive shaft, and a second frame member carrying a driven shaft, said first frame member and said second frame member being foldable relative to each other between a folded position and an unfolded operational position; and
   a coupler, including:
      a first coupler half associated with said drive shaft;
      a second coupler half associated with said driven shaft, said second coupler half and said first coupler half being configured for automatic engagement and disengagement upon said movement between said folded position and said unfolded position respectively, said first coupler half being rotatable around a first axis and said second coupler half being rotatable around a second axis, said first coupler half including a plurality of hooks extending generally radially relative to said first axis, and said second coupler including a plurality of pins extending generally axially relative to said second axis; and
      a flexible shaft interconnecting one of said first coupler half and said second coupler half with a corresponding one of said drive shaft and said driven shaft.

2. The agricultural seeding machine of claim 1, wherein said first coupler half includes a first transverse plate carrying said plurality of hooks, and said second coupler half includes a second transverse plate carrying said plurality of pins.

3. The agricultural seeding machine of claim 2, wherein said plurality of hooks comprises two hooks and said plurality of pins comprises two pins.

4. The agricultural seeding machine of claim 1, wherein said flexible shaft interconnects said second coupler half and said driven shaft.

5. The agricultural seeding machine of claim 4, wherein said flexible shaft is deflectable in a generally radial direction relative to said driven shaft.

6. The agricultural seeding machine of claim 1, wherein said second frame member is generally vertically angularly movable relative to said first frame member when in said unfolded position.

7. The agricultural seeding machine of claim 6, wherein said flexible shaft flexes through said vertically angular movement.

8. An agricultural seeding machine, comprising:
   a seed hopper;
   a first frame member carrying a drive shaft, and a second frame member carrying a driven shaft, said first frame member and said second frame member being foldable relative to each other between a folded position and an unfolded operational position; and
   a coupler, including:
      a first coupler half associated with said drive shaft;
      a second coupler half associated with said driven shaft, said second coupler half and said first coupler half being configured for automatic engagement and disengagement upon said movement between said folded position and said unfolded position respectively, said first coupler half is rotatable around a first axis and said second coupler half is rotatable around a second axis, said first coupler half including one of a plurality of hooks extending generally radially relative to said first axis and a plurality of pins extending generally axially relative to said first axis, and said second coupler half including a mating one of a plurality of hooks extending generally radially relative to said second axis and a plurality of pins extending generally axially relative to said second axis; and
      a flexible shaft interconnecting one of said first coupler half and said second coupler half with a corresponding one of said drive shaft and said driven shaft.

9. A coupling for an agricultural seeding machine for coupling together a drive shaft and a driven shaft, the drive shaft being carried by a first frame member and the driven shaft being carried by a second frame member, the first frame member and the second frame member being foldable relative to each other between a folded position and an unfolded operational position, said coupling comprising:
   a first coupler half associated with said drive shaft;
   a second coupler half associated with said driven shaft, said second coupler half and said first coupler half being configured for automatic engagement and disengagement upon the movement between the folded position and the unfolded position respectively, said first coupler half being rotatable around a first axis and said second coupler half being rotatable around a second axis, said first coupler half including a plurality of hooks extending generally radially relative to said first axis, and said second coupler including a plurality of pins extending generally axially relative to said second axis; and
   a flexible shaft interconnecting one of said first coupler half and said second coupler half with a corresponding one of said drive shaft and said driven shaft.

10. The coupling for an agricultural seeding machine of claim 9, wherein said first coupler half includes a first transverse plate carrying said plurality of hooks, and said second coupler half includes a second transverse plate carrying said plurality of pins.

11. The coupling for an agricultural seeding machine of claim 10, wherein said plurality of hooks comprises two hooks and said plurality of pins comprises two pins.

12. The coupling for an agricultural seeding machine of claim 9, wherein said flexible shaft interconnects said second coupler half and said driven shaft.

13. The coupling for an agricultural seeding machine of claim 12, wherein said flexible shaft is deflectable in a generally radial direction relative to said driven shaft.

14. The coupling for an agricultural seeding machine of claim 9, wherein said second frame member is generally vertically angularly movable relative to said first frame member when in said unfolded position.

15. The coupling for an agricultural seeding machine of claim 14, wherein said flexible shaft flexes through said vertically angular movement.

16. A coupling for an agricultural seeding machine for coupling together a drive shaft and a driven shaft, the drive shaft being carried by a first frame member and the driven shaft being carried by a second frame member, the first frame member and the second frame member being foldable relative to each other between a folded position and an unfolded operational position, said coupling comprising:
   a first coupler half associated with said drive shaft;
   a second coupler half associated with said driven shaft, said second coupler half and said first coupler half being configured for automatic engagement and disengagement upon the movement between the folded position and the unfolded position respectively, said first coupler half is rotatable around a first axis and said second coupler half is rotatable around a second axis, said first coupler half including one of a plurality of hooks extending generally radially relative to said first axis and a plurality of pins extending generally axially relative to said first axis, and said second coupler half including a mating one of a plurality of hooks extending generally radially relative to said second axis and a plurality of pins extending generally axially relative to said second axis; and a flexible shaft interconnecting one of said first coupler half and said second coupler half with a corresponding one of said drive shaft and said driven shaft.

17. A method of operating an agricultural seeding machine, comprising the steps of:

providing a first frame member carrying a drive shaft, and a second frame member carrying a driven shaft;

providing a coupler, including:

a first coupler half associated with said drive shaft;

a second coupler half associated with said driven shaft; and a flexible shaft interconnecting one of said first coupler half and said second coupler half with a corresponding one of said drive shaft and said driven shaft;

unfolding said first frame member and said second frame member to an unfolded operational position;

deflecting said flexible shaft when said first frame member and said second frame member are at said unfolded operational position; and automatically engaging a plurality of hooks extending from said first coupler half with a plurality of mating pins extending from said second coupler half 18. The method of operating an agricultural seeding machine of claim 17, including the further steps of:

folding said first frame member and said second frame member; and automatically disengaging said first coupler half and said second coupler half upon commencement of said folding step.

19. The method of operating an agricultural seeding machine of claim 17, wherein said plurality of hooks extend generally radially relative to said drive shaft, and said plurality of pins extend generally axially relative to said driven shaft; and including the steps of rotating said drive shaft, and hooking said plurality of pins with said plurality of hooks.

20. The method of operating an agricultural seeding machine of claim 17, including the steps of:

moving said second frame member through a generally vertically angular motion relative to said first frame member when in said unfolded position; and flexing said flexible shaft through said vertically angular motion.

* * * * *